United States Patent
Rastegar et al.

(10) Patent No.: US 9,620,285 B2
(45) Date of Patent: Apr. 11, 2017

(54) CAPACITORS FOR HIGH VOLTAGE CHARGE AND HIGH CURRENT DISCHARGE RATES

(71) Applicants: Jahangir S Rastegar, Stony Brook, NY (US); Dake Feng, Kings Park, NY (US)

(72) Inventors: Jahangir S Rastegar, Stony Brook, NY (US); Dake Feng, Kings Park, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 86 days.

(21) Appl. No.: 14/335,283

(22) Filed: Jul. 18, 2014

(65) Prior Publication Data

US 2015/0022947 A1 Jan. 22, 2015

Related U.S. Application Data

(60) Provisional application No. 61/847,939, filed on Jul. 18, 2013.

(51) Int. Cl.
   *H01G 4/228* (2006.01)
   *H01G 4/01* (2006.01)
   *H01G 4/33* (2006.01)

(52) U.S. Cl.
   CPC .............. *H01G 4/01* (2013.01); *H01G 4/228* (2013.01); *H01G 4/33* (2013.01)

(58) Field of Classification Search
   CPC .......... H01G 4/33; H01G 4/228; H01G 4/236; H01G 4/01; H01G 4/26; H05K 1/0231
   See application file for complete search history.

(56) References Cited

U.S. PATENT DOCUMENTS

| | | | | | |
|---|---|---|---|---|---|
| 4,127,891 | A | * | 11/1978 | Rayburn | H01G 4/26 361/301.5 |
| 2008/0235944 | A1 | * | 10/2008 | Miller | H01G 9/016 29/857 |
| 2010/0296223 | A1 | * | 11/2010 | Myers | H01G 4/1218 361/275.1 |
| 2013/0141834 | A1 | * | 6/2013 | Le Neel | H01G 7/04 361/301.1 |
| 2013/0258545 | A1 | * | 10/2013 | Yano | H01G 4/306 361/301.4 |

\* cited by examiner

*Primary Examiner* — Dion R Ferguson (57) ABSTRACT

A capacitor including: a first conductive plate; a second conductive pate arranged parallel to the first conductive plate to define a spacing between a surface of the first conductive plate and an opposing surface of the second conductive plate; a dielectric material disposed in the plate; and a capacitor lead connected to one of the first and second conductive plates at a connection region; wherein a thickness of the space is varied in the connection region.

19 Claims, 7 Drawing Sheets

CAPACITORS FOR HIGH VOLTAGE CHARGE AND HIGH CURRENT DISCHARGE RATES

CROSS-REFERENCE TO RELATED APPLICATION

This application claims the benefit of priority to U.S. Provisional Application No. 61/847,939, filed on Jul. 18, 2013, the entire contents of which is incorporated herein by reference.

BACKGROUND OF THE INVENTION

1. Field of the Invention

The present invention relates generally to capacitors for high voltage charging and high current discharging rates, and more particularly for transferring high voltage but relatively low energy charges for storage such as high voltage and short duration pulses such as those generated by devices such as piezoelectric elements when subjected to shock loading and rapid discharge of the collected charges.

2. Prior Art

Capacitors are passive two-terminal electrical components that are used to store electrical energy by the generated electrostatic electric fields. In contrast, batteries store chemical energy which is then transformed into electrical energy. The construction of currently available capacitors varies widely, but they all contain at least two electrical conductor elements that are separated by a dielectric (insulator) element. For example, one common capacitor construction consists of metal foils that are separated by a thin layer of insulating film.

In a capacitor, when voltage (a potential difference) is provided across the conductors, a static electric field is developed across the dielectric element between the conductors, causing positive charges to be collected on one conductor element and negative charges on the other conductor element. Energy is thereby stored in the electrostatic field. An ideal capacitor is characterized by a single constant value called capacitance. Capacitance is the ratio of the electric charges on each conductor element to the potential difference between them. The SI unit of capacitance is Farad (F), which is defined as being equal to one Coulomb (C) per Volt (V).

Figure 1:
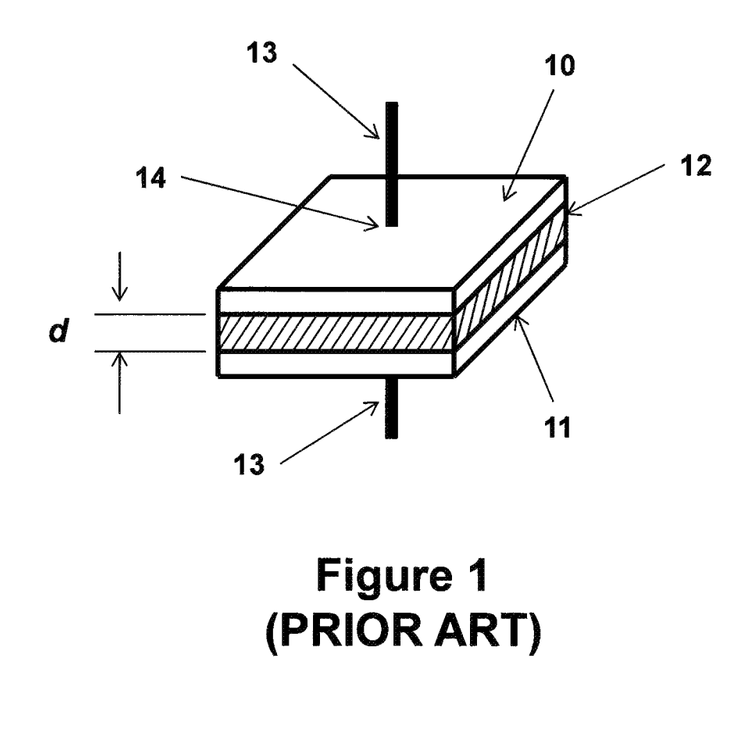
FIG. 1 is the schematic of a capacitor illustrating its basic construction.

A simple capacitor construction is shown schematically in FIG. 1. It consists of two parallel conductive plates 10 and 11 separated by a dielectric layer 12 with permittivity $\in$ (such as air). The capacitor model shown in FIG. 1 may also be used to make qualitative predictions for other capacitive device geometries. The conductive plates 10 and 11 are considered to extend uniformly over an area A and a charge density $\pm\rho=\pm Q/A$ exists on their surface. Assuming that the width of the plates is much greater than their separation d, the electric field near the center of the device will be uniform with the magnitude $E=\rho/\in$. The voltage is defined as the line integral of the electric field between the plates $$V = \int_0^d E\,dz = \int_0^d \frac{\rho}{\varepsilon}\,dz = \frac{\rho d}{\varepsilon} = \frac{Qd}{\varepsilon A}$$

Solving this for C=Q/V reveals that capacitance increases with area and decreases with separation $$C = \frac{\varepsilon A}{d}$$

The capacitance is therefore greatest in devices made with dielectric materials with a high permittivity, large plate 10 and 11 surface area, and small distance d between plates.

As is shown in the schematic of FIG. 1, certain conductive leads 13 are also attached to the conductive plates 10 and 11, through with the capacitor is connected to the intended electrical or electronic circuitry. In the schematic of FIG. 1, the conductive lead is shown to be connected to the top plate 10 at the point 14.

Capacitors deviate from the aforementioned ideal capacitor model in a number of ways. Some of these, such as leakage current and parasitic effects are nearly linear and can be dealt with by adding virtual components to the equivalent circuit of the capacitor. In other cases, such as with breakdown voltage, the effect is non-linear. Other factors such as temperature dependency may also become important. Finally, combined parasitic effects such as inherent inductance, resistance, or dielectric losses can exhibit non-uniform behavior at variable frequencies of operation.

In practice, the dielectric between the plates passes a small amount of leakage current and also has an electric field strength limit, the breakdown voltage. The conductors and leads also introduce generally undesired inductance and resistance.

Above a particular electric field, known as the dielectric strength $E_{ds}$, the dielectric in a capacitor becomes conductive. The voltage at which this occurs is called the breakdown voltage of the device and is given by the product of the dielectric strength and the separation between the conductors $$V_{bd}=E_{ds}\,d$$

The maximum energy that can be stored safely in a capacitor is limited by the breakdown voltage.

The breakdown voltage is critically affected by factors such as the geometry of the capacitor conductive parts; sharp edges or points increase the electric field strength at that point and can lead to a local breakdown.

In certain applications such as when collecting charges from piezoelectric elements used in energy harvesting devices, the total amount of available charges for transfer to storage capacitor(s) is relatively low but is high in voltage. In such applications, since the amount of electrical energy generated by the piezoelectric elements is proportional to the square of the generated voltage level, it is highly desirable to design such electrical energy harvesting (generator) devices to operate at high voltage levels. In such applications, the capacitance of the required storage capacitor(s) can be readily determined to ensure that upon transfer of the generated charges, the voltage level of the capacitor is below the capacitor breakdown voltage. However, since the initial voltage of the piezoelectric (or the like) element is significantly higher than the breakdown voltage of the capacitor, appropriate steps are required to be taken to avoid damage to the collection capacitor(s). Examples of such steps and the means of implementing them may include various circuitry and components to lower the voltage below the capacitor breakdown voltage. Such voltage reduction circuitry and other methods developed to date have significant shortcomings for use in energy harvesting and other similar devices in which relatively small amount of electrical charge and high voltage, such as charges generated by a piezoelectric element under shock loading, is to be transferred to a capacitor(s) for storage. Here, by relatively small amount of charges refers to those amounts of charges that once stored in the target capacitor(s) would result in capacitor voltages that are below their breakdown voltages.

It is therefore highly desirable to have capacitors available for storing electrical energy generated by devices such as energy harvesting devices using piezoelectric elements or magnet and coil devices or other similar devices in which the electrical energy is generated as high voltage and relatively low charge pulses. Such capacitors would then allow the energy harvesting (electrical energy generators) to operate at high levels of efficiency by generating significantly larger amount of electrical energy than is otherwise possible at low voltage below capacitor breakdown voltages. For example, a piezoelectric element used in an electrical energy generator of an energy harvesting device or other devices using similar electrical energy generation methods with piezoelectric elements or the like can readily generate relatively small amount of charges at voltages exceeding 200 Volts, which is significantly higher than the breakdown voltage of around 10 Volts or lower for capacitors with high energy density.

It is appreciated by those skilled in the art that capacitors with high energy densities are constructed with very thin dielectric elements and thereby with relatively low breakdown voltages. A goal of the present invention is to provide novel methods and means of making such high energy density capacitors capable of accepting "pulsed" electrical energy charges at high voltages such as those generated by piezoelectric elements of energy harvesting power sources that generate electrical energy by "pulses" of electrical charges at high voltages relative to the breakdown voltages of said capacitors. The electrical energy "pulses", once charges have distributed over the capacitor conductors, i.e., once a steady state condition has been reached, are considered to generate capacitor voltages that are at or below the breakdown voltages of said capacitors.

SUMMARY OF THE INVENTION

A need therefore exists for the development of novel methods to design and construct high energy density capacitors that can be charged by "pulses" of relatively small amount of electrical charges at high voltages. Such high voltage electrical energy charge "pulses" are, for example, generated by electrical energy generators such as piezoelectric elements used in energy harvesting devices; multi-stage electrical energy generators such as those described in the U.S. Pat. Nos. 8,410,667; 8,134,281 and 7,821,183; or other devices generating such relatively high voltage "pulses" that can provide only a small amount of electrical energy and the like.

Such high energy density capacitors can then be charged by such electrical charge pulses at voltages that are significantly higher than their breakdown voltages, thereby making them particularly suitable for efficiently collecting and storing electrical energy generated by the aforementioned electrical energy generating devices, such as piezoelectric based energy harvesting devices.

Herein are described novel methods for the design of and the resulting high energy density capacitors that can be charged with high voltage pulses of relatively low amount of electrical charges. The resulting high density capacitors are particularly suitable for efficiently collecting and storing electrical energy generated by electrical energy generators such as piezoelectric elements used in energy harvesting devices; multi-stage electrical energy generators such as those described in the U.S. Pat. Nos. 8,410,667; 8,134,281 and 7,821,183; or other devices generating such relatively high voltage "pulses" that can provide only a small amount of electrical energy and the like.

It is appreciated by those skilled in the art that once the electrical charges of an input charging electrical energy pulse have been distributed over the capacitor conductors, i.e., once a steady state condition has been reached, the resulting capacitor voltage is considered to be at or below the breakdown voltages of said capacitor.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION OF THE PREFERRED EMBODIMENT

As was previously described, breakdown voltage is a characteristic of the capacitor dielectric material (insulator), element 12 in FIG. 1, which defines the maximum voltage difference that can be applied across the material before the insulator collapses and conducts. The usual breakdown route is that the field strength becomes large enough to pull electrons in the dielectric from their atoms thus causing conduction. When the charged capacitor voltage is to be increased, the dielectric must be made to be thicker, making high-voltage capacitors larger per capacitance than those rated for lower voltages.

For the present case of transferring high voltage pulses with relatively small amounts of charges, the final capacitor voltage following the transient charge transfer event(s) from such a pulse(s) is considered to be below the breakdown voltage of the capacitor. In such applications, such as the aforementioned high voltage electrical energy charge "pulses", for example, those generated by electrical energy generators such as piezoelectric elements used in energy harvesting devices; multi-stage electrical energy generators such as those described in the U.S. Pat. Nos. 8,410,667; 8,134,281 and 7,821,183; or other devices generating such relatively high voltage "pulses" that can provide only a small amount of electrical energy and the like, currently available (high energy density) capacitors that are designed with relatively low breakdown voltage fail due to high local voltages around the input lead (at the points 14 where the leads 13 are attached to the conductive plates 10 and 11 in the schematic of FIG. 1).

It is appreciated by those skilled in the art that if the conductivity of the conductive plates 10 and 11, FIG. 1, were infinite, then in such an ideal condition the incoming charges would have been distributed uniformly over the conductive plates 10 and 11 at the speed of light, i.e., essentially instantaneously, considering the relatively small size of even a very large capacitor plate. Conductive plates that are used in capacitors, particularly since they have to be very thin to minimize the occupied volume and thereby maximize energy storage density of a capacitor, are not ideal conductors and provide resistance to the flow of charges, thereby to the essentially "instantaneous" uniform distribution of the input charges. The conductive plates 10 and 11 can fairly accurately be modeled as a network of ideal resistors with appropriate resistance and inductors, with capacitors connecting the nodes of the top and bottom ideal networks (conducting plates) as shown in the FIG. 2.

Figure 2:
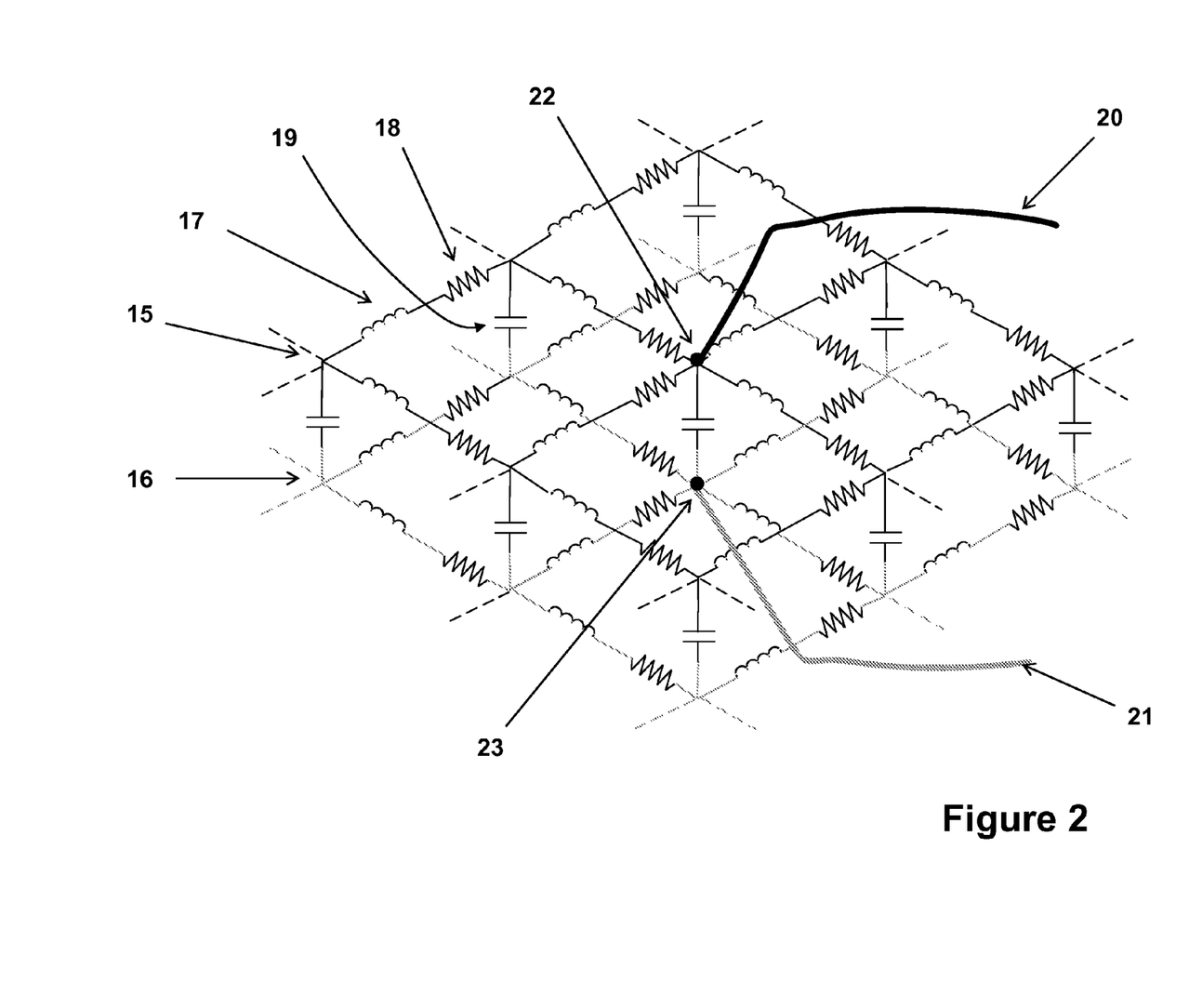
FIG. 2 illustrates a representative model of a typical capacitor with the two conductor plates represented with discrete equivalent resistors and inductors that are connected at their nodes with capacitors.

In FIG. 2, the models of the top and bottom conductive plates are indicated by the numerals 15 and 16, respectively. For each conductive plate model, ideal resistors 18 and inductors 17 may be considered as interconnected as shown in FIG. 2. Such discrete models of the conductive plate models with appropriate resistance and inductance values for the resistors 18 and inductors 17 can be constructed to fairly accurately represent the actual behavior of present capacitors. The total capacitance of the capacitor is similarly represented by discrete capacitors 19 which connect the nodes of the network of resistors 18 and inductors 17 as shown in FIG. 2. In the capacitor model of FIG. 2, the capacitor leads 20 and 21 are considered to be connected to the top and bottom conductive plates 15 and 16 at the nodes 23 and 24, respectively, of the equivalent models of the conductive plates.

Figure 3:
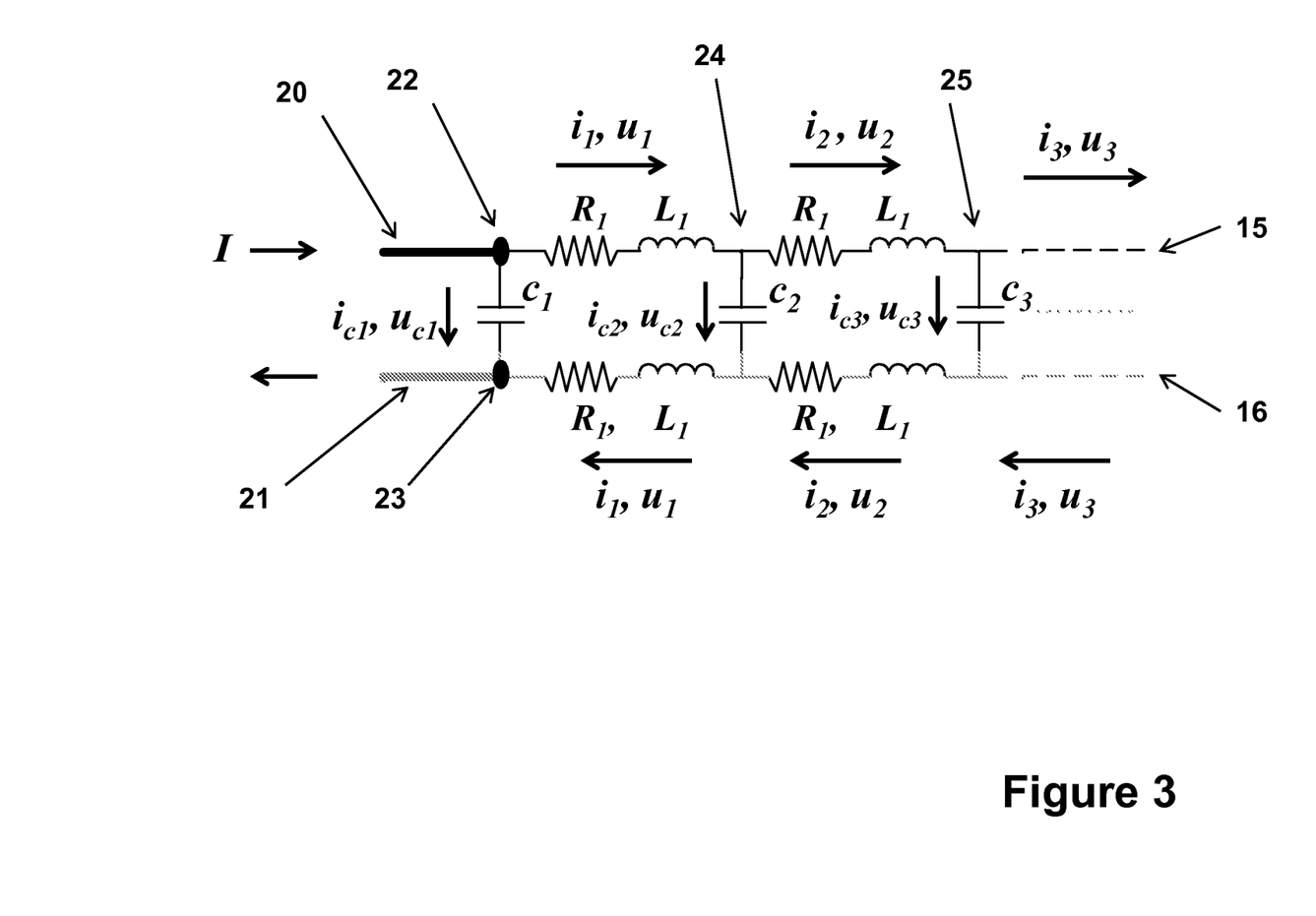
FIG. 3 represent a simplified electrical circuit model of several of the discrete resistor, inductor and capacitor modes around the capacitor lead connections to the top and bottom conductive plates of the capacitor.

FIG. 3 represent a simplified electrical circuit model of several of the discrete resistor, inductor and capacitor modes around the capacitor leads 20 and 21 connections to the top and bottom conductive plates 15 and 16 at the nodes 22 and 23, respectively. In the circuit diagram of FIG. 3 only a limited number of the aforementioned network of the top and bottom conductive plate networks are shown for the sake of simplicity since they are enough to illustrate the present phenomenon of charge flow that results in momentary high voltage regions around the points of said lead connections to the capacitor conductive plates as a result of high voltage input pulses.

In the circuit model of FIG. 3, the aforementioned discrete resistors and inductors 18 and 17, respectively, shown in FIG. 2 are considered to have equal values and indicated as $R_1$ and $L_1$. Then at a certain instant, the current inflow from the lead 20 at the node 22 of the top conductive plate 15 is considered to be given by I, FIG. 3. Then the potential difference $u_{c1}$ between the nodes 22 and 23 and the current I can be shown to be $$u_{c1} = \frac{1}{c_1} \int i_{c1} dt = 2u_1 + u_{c2} = 2\left(i_1 R_1 + L_1 \frac{di_1}{dt}\right) + u_{c2} > u_{c2}$$

$$I = i_{c1} + i_1$$

Thus, as can be seen from the above relationships, due to the conductive plate resistance and inductance, $R_1$ and $L_1$, between the nodes 22 and 23 and their adjacent nodes, the potential difference between the nodes 22 and 23 (i.e., the voltage $u_{c1}$) will be higher than those of the adjacent nodes, represented in the circuitry of FIG. 3 as $u_{c2}$. It is noted here that in the circuitry of FIG. 3 and for the sake of simplicity and without affecting the effects being demonstrated, the four adjacent nodes around the nodes 23 and 23, FIG. 2, are represented with a single nodes. It is appreciated by those skilled in the art that the above relationship represents the transient effects of the capacitor charging and once the charging pulse has abated the voltages at all top and bottom conductor plates will eventually reach essentially the same voltage levels until the next voltage pulse may be applied to the capacitor.

Thus, as it is shown above, when a charging pulse is transmitted to the capacitor through the leads 20 (or 21), the charge density $\pm \rho = \pm Q/A$ around the node 22 (23), i.e., the charge distribution per unit area of the conductive plate around the lead attachment point 22 (23), is significantly higher than "downstream", i.e., on surfaces beyond the nodes 22 (23), FIG. 3. For example, the highest charge density will be around the node 22, and lower around the node 24 and even lower around the node 25 and so on. As a result, when the input charging pulse generates a high enough voltage potential difference between the nodes 22 and 23 (i.e., the voltage $u_{c1}$), then the electric field across the dielectric material between the conductive plates 15 and 16 (FIGS. 2 and 3) between the areas around the nodes 22 and 23 can become high and beyond the aforementioned dielectric strength $E_{ds}$ of the capacitor dielectric material (element 12 in FIG. 1), thereby cause breakdown of the dielectric material.

It is appreciated by those skilled in the art that the aforementioned dielectric strength $E_{ds}$ of the capacitor dielectric material (element 12 in FIG. 1) is dependent on the characteristics of the dielectric material that is used, its thickness (d in FIG. 1) and the capacitor geometry. In addition, the voltage potential difference between the nodes 22 and 23 (i.e., the voltage $u_{c1}$) that is reached as a result of the applied input charging pulse, is dependent on the characteristics of the capacitor conductive plates (10 and 11 in FIGS. 1 and 15 and 16 in the models of FIGS. 2 and 3) and the capacitor geometry, i.e., on the values of the equivalent model resistances 18 and inductors 17. It is also appreciated that in many cases, the dielectric strength $E_{ds}$ of the capacitor dielectric material may not be the same when the applied electric field is static or dynamic and the charge pulse profile might also have to be considered when determining the dielectric strength $E_{ds}$ that should be used in the present capacitor design calculations.

It is appreciated by those skilled in the art that capacitors with high energy densities are constructed with very thin dielectric elements and thereby with relatively low breakdown voltages. An objective of the present invention is to provide novel methods and means of constructing such high energy density capacitors capable of accepting "pulsed" electrical energy charges at high voltages such as those generated by piezoelectric elements of energy harvesting power sources that generate electrical energy by "pulses" of electrical charges at high voltages relative to the breakdown voltages of said capacitors. The electrical energy "pulses", once the charges have been distributed over the capacitor conductors, i.e., once a steady state condition has been reached, are considered to generate capacitor voltages that are at or below the breakdown voltages of said capacitors. In the following embodiments, different novel methods for designing such capacitors and means of their construction are described.

Figure 4:
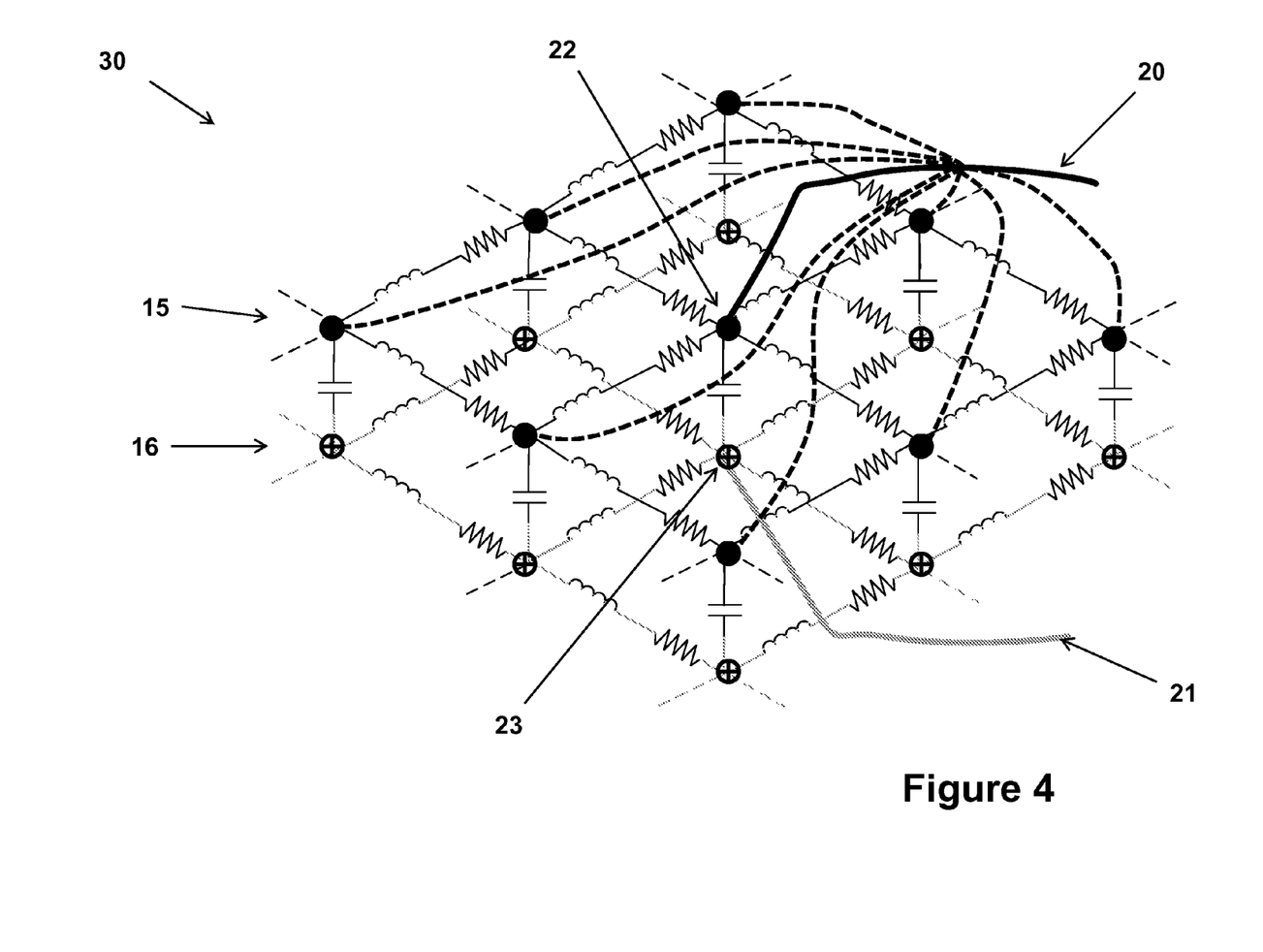
FIG. 4 illustrates the first embodiment of the present capacitor designed to accommodate charging with high voltage pulses.

The first embodiment 30 is described using the discrete model of the capacitor shown in FIG. 2 as redrawn in FIG. 4. In the embodiment 30, the capacitor lead 20 which was connected to a single node 22 in the schematic of FIG. 2, is now connected to multiple nodes (shown with black dots) on the top conductor plate 15 of the capacitor. In the schematic of FIG. 4 the capacitor lead 20 is shown to be connected to eight adjacent nodes of the top conductor plate 15 of the capacitor 30 (the connecting wires are shown with dashed lines). That is, the lead 20 is connected at eight different locations around the original connection point 22 to the top conducting plate 15 of the capacitor 30. The lead 21 is also preferably connected to the facing nodes of the bottom plate 16 shown as crossed circles in FIG. 4 (the corresponding wires not shown in FIG. 4 for the sake of clarity). It is appreciated by those skilled in the art that by providing the indicated multiple connecting points to the top and bottom conductive plates 15 and 16 for the input leads, respectively, when a charging pulse is transmitted to the capacitor through the leads 20 and 21 and their multiple (eight in the schematic of FIG. 4) connecting wires to adjacent nodes (locations on the conductive plates), thereby the charge density $\pm\rho=\pm Q/A$ over the areas of the multiple input lead connections is going to be significantly lower that it would if the input leads 20 and 21 were connected to single nodes 22 and 23 of the top and bottom conductive plates 15 and 16, respectively.

In the embodiment 30 of FIG. 4, a total of nine leads were shown to be connected to each one of the conductive plates 15 and 16 of the capacitor. However, it is appreciated by those skilled in the art that any number of leads may be connected to each one of the capacitor conductive plates and the numbers do not have to be identical for each conductive plates with the goal of reducing the effective charge density $\pm\rho=\pm Q/A$ at every location over the conductive plates below the breakdown voltages of the capacitor, which may vary over the surface of the capacitor conductive plates.

As was previously described, for a given capacitor design and dielectric material the breakdown voltage of the capacitor is dependent on the thickness of the dielectric material between the conductive plates (the thickness d in the schematic of FIG. 1). For this reason, for capacitors that are designed to operate at higher fully charged voltages, the thickness of the dielectric material of the capacitor is made large enough to bring the capacitor breakdown voltage of the capacitor at or above the desired fully charged capacitor voltages. It is, however, appreciated by those skilled in the art that the capacitor embodiments are intended for charging cases in which the electrical energy is at least partly transferred to the capacitor in the form of high voltage "pulses", which once the charges have been distributed over the capacitor conductors, i.e., once a steady state condition has been reached, the capacitor voltages are at or below the breakdown voltages of said capacitors.

Figure 5:
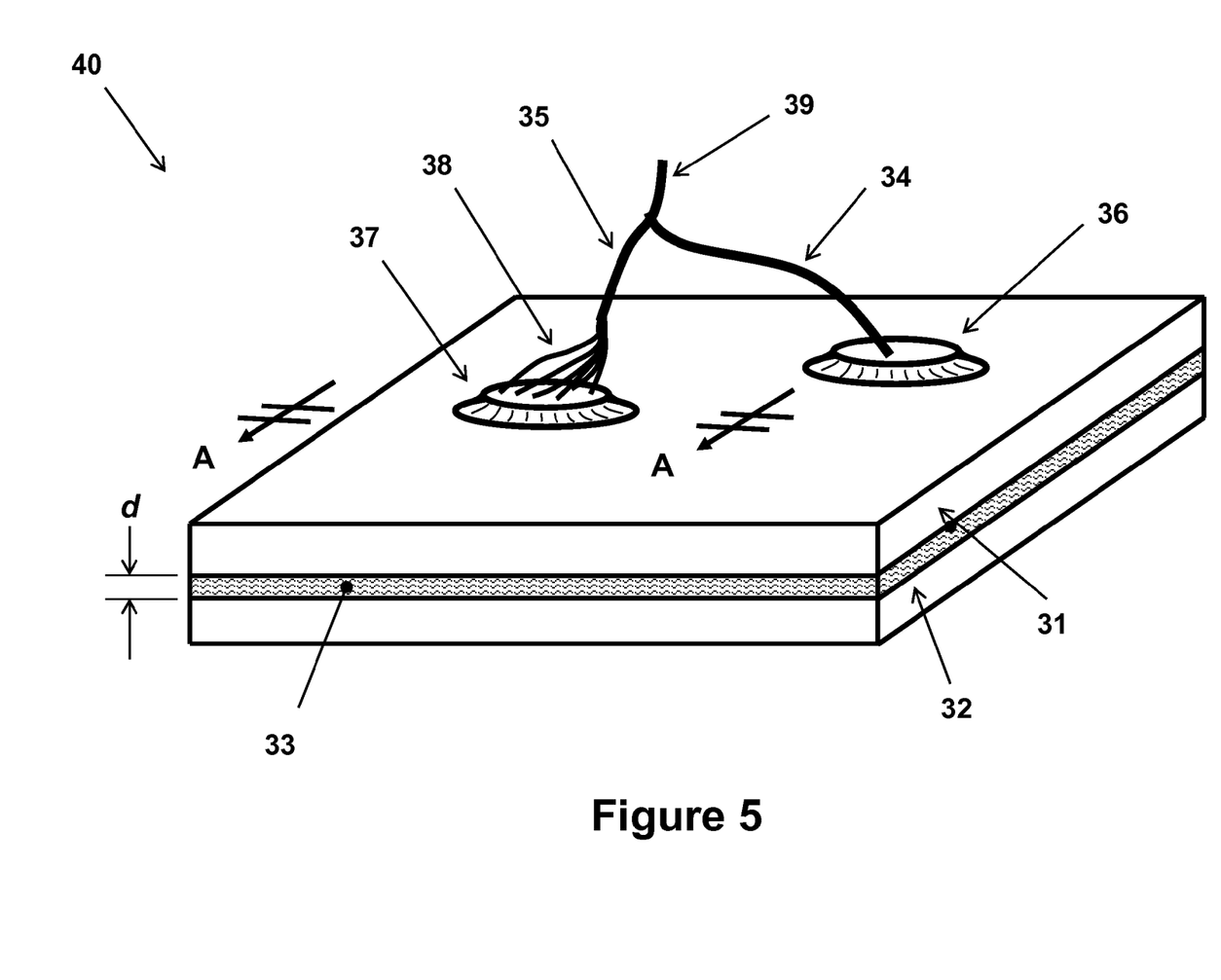
FIG. 5 illustrates the second embodiment of the present capacitor designed to accommodate charging with high voltage pulses.

The second embodiment 40 shown in the schematic of FIG. 5 achieves high voltage pulsed charging capability by providing high breakdown voltage regions around the conductive plate leads of the capacitor. This goal is accomplished by providing larger dielectric thickness (d in the schematic of FIG. 1) in regions of appropriate areas around the conductive plate leads. In the schematic of the embodiment 40, a small portion of the capacitor is shown with its two conductive plates 31 and 32 and the dielectric layer 33 separating them. The dielectric layer is considered to have a thickness d. At least one capacitor lead is considered to be connected to each conductive plate. As an example, in the schematic of FIG. 5, two capacitor leads 34 and 35 are shown to be connected to the conductive plate 31. The two leads 34 and 35 are interconnected to form one lead 39 of the capacitor 40. Similar leads (not shown) are considered to be connected to the other conductive plate 32, preferably facing the capacitor leads 34 and 35, as will be described later in this disclosure. In the schematic of FIG. 5, the lead 34 is shown to have a single connection to the raised region 36 of the conductive plate 32 while the lead 35 has multiple strands 38 (six in the case of the embodiment 40 of FIG. 5) connecting it to the raised region 37 of the conductive plate 31.

Figure 6:
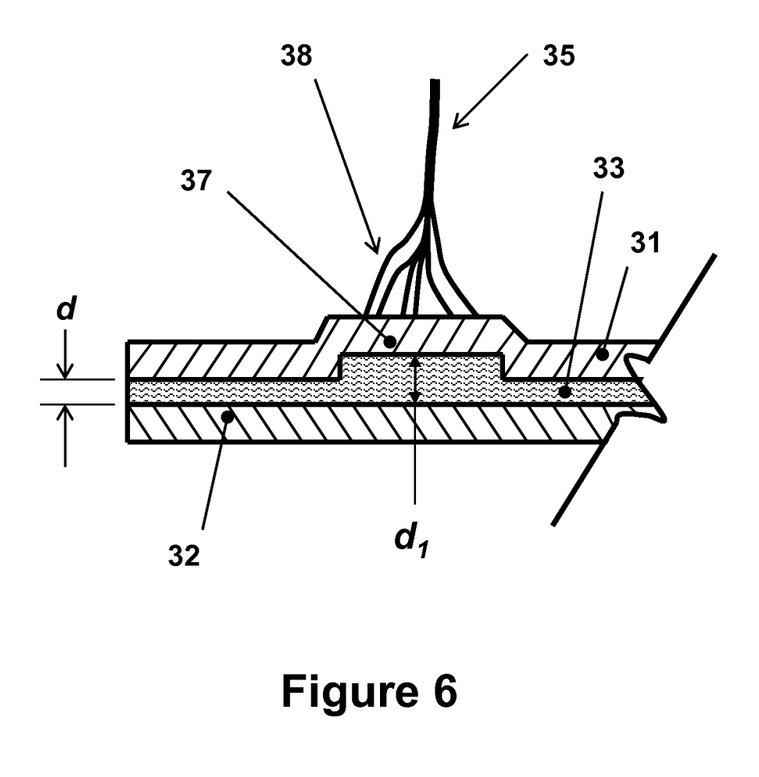
FIG. 6 illustrates a cross-sectional view of the capacitor lead contact regions for the capacitor embodiment of FIG. 5.

As can be seen in the schematic of FIG. 5, the two capacitor leads 34 and 35 (and their facing capacitor leads on the conductive plate 32) are attached to the conductive plate 31 at a region in which the conductive plate 32 is formed into raised surface areas 36 and 37 to accommodate thicker dielectric layer $d_1$ as shown in the cross-sectional view A-A of FIG. 6. The cross-section A-A, FIG. 5, is considered to be through the raised region 37 of the conductive plate 31. In the embodiment 40 of FIG. 5, it is assumed that the region of the conductive plate 32 facing the region 37 of the conductive plate 31 is not raised. It is appreciated by those skilled in the art in raising of both conductive plate regions may not be necessary, particularly if the amount of increase in the dielectric layer (from d to $d_1$) is not substantial and also for reasons related to the ease of capacitor manufacture.

It is, however appreciated by those skilled in the art that if the charging pulse is very high voltage, the facing region of the conductive plate 32 may also have to be raised to obtain large enough dielectric thickness $d_1$ to make it possible to accommodate the pulse voltages without dielectric breakdown.

Alternatively, the embodiment 40 of FIG. 5 may be provided with multiple leads on each conductive plates 31 and 32, each with preferably multiple wires of connecting leads (such as multiple connecting wires 38 of the raised contact region 37 in FIGS. 5 and 6) to achieve the desired effective charge density $\pm\rho=\pm Q/A$ at every lead connection regions over the conductive plates below the breakdown voltages of the capacitor.

Figure 7:
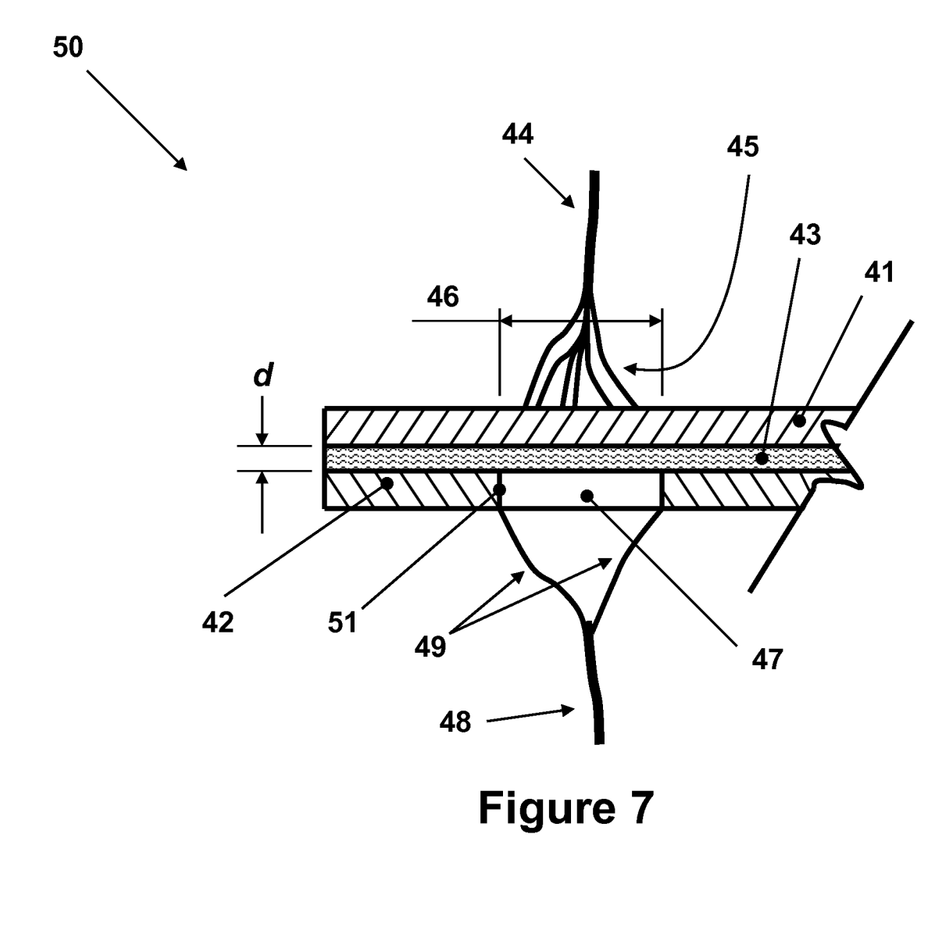
FIG. 7 illustrates the third embodiment of the present capacitor designed to accommodate charging with high voltage pulses.

The second embodiment 50 shown in the schematic of the cross-sectional view of FIG. 7 is designed to achieve high voltage pulsed charging capability by reducing the effective charge density $\pm\rho=\pm Q/A$ at every lead connection regions over the conductive plates below the breakdown voltages of the capacitor. The design of the embodiment 50 is described by the cross-sectional view of FIG. 7 across a typical capacitor lead connection to the capacitor conductive plates 41 and 42. It is appreciated by those skilled in the art that the capacitor embodiment 50 may have multiple such capacitor lead connections to each one of the capacitor conductive plates 41 and 42. The leads connecting to each conductive plate 41 and 42 are then interconnected to form the capacitor input leads for each of the conductive plates. In the cross-sectional view of FIG. 7 the dielectric layer separating the conductive plates 41 and 42 is indicated by the numeral 43.

In the embodiment 50, the at least one lead 44 is connected to one of the conductive plates 41, preferably via more than one wire connections 45 over a surface area 46, which is preferably a circular shape but could be of any shape appropriate to accommodate the capacitor geometry and packaging. An area 47 of the conductive plate 42 that faces the area 46 of the conductive plate 41 is cut out of the conductive plate 42, thereby exposing the corresponding region of the dielectric layer 43. The second lead 48 of the capacitor embodiment 50 is connected to the periphery 51 of the cut out area 47, preferably with multiple wires 49. With the capacitor lead connection configuration illustrated in the schematic of FIG. 7 and described above, the charges of an input high voltage pulse are distributed over the surface of the area 46 of the conductive plate 41 on one side and around the periphery 51 of the cut out area 47, thereby by using a proper number of such lead connections and properly sizing them, the aforementioned charge density ρ at every lead connection region over the conductive plates can be significantly reduced and brought at or below the breakdown voltages of the capacitor dielectric layer, thereby making the capacitor capable of being charged with such high voltage charge pulses.

It is appreciated by those skilled in the art that the methods used in the embodiments 30 and 50 of FIGS. 4 and 7, respectively, to reduce the charge density around the areas of the capacitor lead connections to the capacitor conductive plates and for the method used in the embodiment 40 of FIG. 5 for local increase in the breakdown voltage around the areas of capacitor lead connections to the capacitor conductive plates may be combined. In addition, a capacitor may use more than one of such methods, for example use at least one of more than one such said charge density reduction methods and/or local breakdown voltage increasing method on a single battery.

In the embodiments of FIGS. 4, 5 7 and other provided illustrations the capacitors are shown as being in a flat (planar) configuration. It is, however, appreciated by those skilled in the art that the purpose of these illustrations are to show areas of the capacitor close to its connecting input leads. The capacitor may therefore be configured in a planar configuration or in a rolled configuration or others currently used in industry.

It is also appreciated by those skilled in the art that the methods used in the different embodiments, for example the method of the embodiment of FIG. 4, may also be similarly used for the design of rechargeable batteries for their similar charging with relatively short pulses with voltages that are higher than the battery allowable charging voltage by ensuring that the input high voltage charges are distributed over large areas around the input leads.

While there has been shown and described what is considered to be preferred embodiments, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A high energy density capacitor comprising:
a first conductive layer;
a second conductive layer;
a dielectric layer in contact across a first surface with the first conductive layer and in contact across a second surface with the second conductive layer, the first surface being opposed to the second surface;
a first electrical lead electrically connected to a plurality of portions of the first conductive layer; and
a second electrical lead electrically connected to the second conductive layer;
wherein the first and second conductive layers are modeled as a network of ideal resistors and inductors having a plurality of connecting nodes located at intersections of the network and with capacitors connecting the plurality of connecting nodes of the networks of the first and second conductive layers; and
the first electrical lead is electrically connected to the plurality of portions of the first conductive layer through two or more of the plurality of connecting nodes.

2. The high energy density capacitor of claim 1, wherein the first conductive lead comprises a branch that branches the first conductive lead to a plurality of branching wires and the plurality of branching wires are electrically connected to corresponding ones of the plurality of portions of the first conductive layer.

3. The high energy density capacitor of claim 1, wherein the second electrical lead is electrically connected to a plurality of portions of the second conductive layer.

4. The high energy density capacitor of claim 3, wherein each one of the plurality of portions of the first conductive layer are opposed to corresponding ones of the plurality of portions of the second conductive layer.

5. The high energy density capacitor of claim 1, wherein the plurality of portions of the first conductive layer form a grid pattern across the first conductive layer.

6. The high energy density capacitor of claim 5, wherein the second electrical lead is electrically connected to a plurality of portions of the second conductive layer and the plurality of portions of the second conductive layer form a grid pattern across the second conductive layer.

7. The high energy density capacitor of claim 1, wherein the grid pattern across the first conductive layer is comprised of connecting nodes that correspond to opposed connecting nodes on the grid pattern of the second conductive layer.

8. The high energy density capacitor of claim 1, wherein the first conductive layer, the dielectric layer and the second conductive layer are planer.

9. The high energy density capacitor of claim 1, wherein the first conductive layer, the dielectric layer and the second conductive layer are rolled together forming a spiral of layers.

10. A high energy density capacitor comprising:
a first conductive layer;
a second conductive layer;
a dielectric layer in contact across a first surface with the first conductive layer and in contact across a second surface with the second conductive layer, the first surface being opposed to the second surface;
a first electrical lead electrically connected to a plurality of portions of the first conductive layer; and
a second electrical lead electrically connected to the second conductive layer;
wherein the dielectric layer generally has a thickness d between the first and second surfaces except where the dielectric layer is in contact with the first conductive layer in one or more areas around the plurality of portions of the first conductive layer where the dielectric layer has a thickness greater than d.

11. The high energy density capacitor of claim 10, wherein the second electrical lead is electrically connected to a plurality of portions of the second conductive layer.

12. The high energy density capacitor of claim 11, wherein each one of the plurality of portions of the first conductive layer are opposed to corresponding ones of the plurality of portions of the second conductive layer.

13. The high energy density capacitor of claim 10, wherein one of the one or more areas of the dielectric layer that has the thickness greater than d is around at least first and second ones of the plurality of portions of the first conductive layer.

14. The high energy density capacitor of claim 13, wherein the one or more areas of the dielectric layer that has the thickness greater than d is two or more areas of the dielectric layer that has the thickness greater than d and a second one of the two or more areas of the dielectric layer that has the thickness greater than d is around at least a third one of the plurality of portions of the first conductive layer.

15. A high energy density capacitor comprising:
a first conductive layer;
a second conductive layer;
a dielectric layer in contact across a first surface with the first conductive layer and in contact across a second surface with the second conductive layer, the first surface being opposed to the second surface;
a first electrical lead electrically connected to a plurality of portions of the first conductive layer; and
a second electrical lead electrically connected to the second conductive layer;
wherein a part of the second conductive layer is removed exposing a corresponding part of the second surface of the dielectric layer, the second electrical lead being electrically connected to a periphery of the removed part of the second conductive layer, at least first and second ones of the plurality of portions of the first conductive layer are within a part of the first conductive layer, and the part of the first conductive layer is opposed to the removed part of the second conductive layer.

16. The high energy density capacitor of claim 15, wherein the second electrical lead is electrically connected to a plurality of portions of the second conductive layer and first and second ones of the plurality of portions of the second conductive layer are connected around the periphery of the removed part of the second conductive layer.

17. The high energy density capacitor of claim 15, wherein the exposed part of the second surface of the dielectric layer is circular.

18. The high energy density capacitor of claim 15, wherein the removed part of the second conductive layer is one of a plurality of removed parts of the second conductive layer that expose a corresponding plurality of parts of the second surface of the dielectric layer, the second electrical lead being electrically connected to a periphery of the plurality of removed parts of the second conductive layer, at least two of the plurality of portions of the first conductive layer are within each of a plurality of parts of the first conductive layer, and each of the plurality of parts of the first conductive layer are opposed to corresponding ones of the plurality of removed parts of the second conductive layer.

19. The high energy density capacitor of claim 18, wherein the second electrical lead is electrically connected to at least two places around the periphery of each of the plurality of removed parts of the second conductive layer.

* * * * *